United States Patent
Makki et al.

(10) Patent No.: US 6,352,490 B1
(45) Date of Patent: Mar. 5, 2002

(54) OPTIMIZATION METHOD FOR A LEAN CAPABLE MULTI-MODE ENGINE

(75) Inventors: Imad Hassan Makki, Dearborn Heights; James Michael Kerns, Trenton; John Ottavio Michelini, Sterling Heights, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/498,141

(22) Filed: Feb. 4, 2000

(51) Int. Cl.$^7$ .................. B60R 41/02; B60R 41/24; B60R 41/28; F02M 51/00
(52) U.S. Cl. ................. 477/78; 123/478; 123/295
(58) Field of Search .................. 477/78, 110, 115; 123/478, 333, 295, 698

(56) References Cited

U.S. PATENT DOCUMENTS

| | | |
|---|---|---|
| 4,739,483 A | 4/1988 | Ina et al. |
| 4,964,318 A | 10/1990 | Ganoung |
| 5,094,213 A | 3/1992 | Dudek et al. |
| 5,209,213 A | 5/1993 | Miyashita et al. |
| 5,243,881 A | 9/1993 | Hayashi |
| 5,470,290 A | 11/1995 | Minowa et al. |
| 5,496,227 A | 3/1996 | Minowa et al. |
| 5,642,709 A | 7/1997 | Ozaki et al. |
| 5,813,387 A | 9/1998 | Minowa et al. |
| 5,875,761 A | 3/1999 | Fujieda et al. |
| 6,041,757 A * | 3/2000 | Kadota ............ 123/478 |
| 6,062,189 A * | 5/2000 | Kaneko et al. ....... 123/295 |

FOREIGN PATENT DOCUMENTS

DE  198 27 636 A1  *  1/1999

* cited by examiner

Primary Examiner—Sherry Estremsky
Assistant Examiner—Tisha D. Lewis
(74) Attorney, Agent, or Firm—John D. Russell

(57) ABSTRACT

A method of generating a shift schedule and combustion mode schedule to optimize performance characteristics of a lean capable, multiple combustion mode engine with a time-variant after-treatment system is disclosed. The method comprises the steps of generating a lowest cost value for fuel economy and vehicle emissions as a function of an engine operating mode, wherein the engine operating mode is selected from a group consisting of a homogeneous stoichiometric mode, a homogeneous lean mode, and a stratified mode. The lowest cost value is stored in a shift schedule and combustion mode schedule along with the engine operating parameters that achieved the lowest cost value.

14 Claims, 7 Drawing Sheets

OPTIMIZATION METHOD FOR A LEAN CAPABLE MULTI-MODE ENGINE

TECHNICAL FIELD

This invention relates to a method of optimizing performance characteristics of internal combustion engines and more particularly to a method of optimizing performance and fuel economy with emissions constraints in a lean capable engine that can operate in multiple combustion modes having a time variant after-treatment system.

BACKGROUND

Manufacturers have been continuously improving the performance of internal combustion engines. In order to meet ever-increasing standards for fuel economy and vehicle emissions, however, manufacturers have been forced to consider new methods for increasing fuel economy and reducing undesirable fuel emissions. One improvement being considered is a lean capable engine, such as a direct injection engine, that can operate in multiple combustion modes.

Conventional internal combustion engines use fuel injectors to precisely control the amount of fuel inducted into the engine's cylinders. Also, fuel injectors atomize the liquid fuel, increasing the homogeneity of the air and fuel mixture. In conventional internal combustion engines, this air and fuel is mixed prior to entering the combustion chamber.

In contrast, in a direct injection engine, fuel and air mix in the combustion chamber itself. The primary benefit of this is that the fuel burns more thoroughly, and correspondingly delivers more power and fuel economy as compared to a conventional internal combustion engine.

Lean capable, multiple combustion mode engines, such as a direct injection engine, can provide power in three basic combustion modes, those being homogeneous stoichiometric, homogeneous lean, and stratified.

The homogeneous stoichiometric mode can be used under almost any operating condition. During homogeneous stoichiometric operation, the engine operates at an air/fuel ratio (AFR) near stoichiometry or approximately 14.6:1.

The homogeneous lean mode, on the other hand, is desirable only at moderate engine loads. During homogeneous lean operation, the engine operates at an AFR of approximately 18:1 to 25:1. As the engine load increases, however, the homogeneous lean mode is limited by the engine's ability to produce torque. In addition, at the lower end of engine loads, the homogeneous lean mode is limited by combustion stability.

The stratified mode is desirable only at lower engine speeds and torque operating points. High load operation may result in undesirable hydrocarbon (HC) and smoke emissions. Unlike the homogeneous lean mode, however, the stratified mode can be used at very low engine loads, including idle. Stratified operation is characterized by an overall AFR between approximately 25:1 and 40:1.

These various combustion modes have an effect on the exhaust gas emissions of lean capable, multiple combustion mode engines. Typically, an additional three-way catalyst is positioned downstream of a first three-way catalyst. The additional catalyst, sometimes referred to as a lean $NO_x$ trap (LNT) is periodically purged by operating the engine at a rich air/fuel ratio to release and reduce stored $NO_x$. This is referred to as a time-variant after-treatment system because the LNT efficiency, and hence, the efficiency of the after-treatment system, changes with time as the LNT fills with $NO_x$.

Thus, there exists a need for optimized mode scheduling to minimize fuel consumption and minimize exhaust gas emissions for lean capable, multiple combustion mode engines having a time-variant after-treatment system.

SUMMARY OF THE INVENTION

It is an object of the present invention to provide an optimization methodology to determine the optimum transmission gear, combustion mode, air/fuel ratio (AFR), spark advance, and amount of exhaust gas recirculation (EGR) for emissions-constrained lean capable, multiple combustion mode engines having a time-variant after-treatment system.

The above and other objects and advantages are achieved by providing a method of determining a desired transmission gear, combustion mode, AFR, spark advance, and EGR rate for all of the possible engine speed and wheel torque values. The method comprises the steps of, starting at the vehicle level, determining the range of speeds and wheel torques. A cost value, which is a function of fuel economy and emissions, is then initialized at a large value for spark advance, EGR, AFR, combustion mode, and transmission gear (respectively Jspark, Jegr, Jafr, Jmode, and Jgear). For each combustion mode (homogeneous stoichiometric, homogeneous lean, or stratified) at each transmission gear, the AFR, EGR and spark advance are varied to minimize the cost values associated with fuel flow and emissions with respect to target values. A cost value for the evaluation (Jeval) is calculated using a Lagrangian weighting factor. The resulting values are considered a local minimum. A repetitive process of comparing the various cost values to one another (i.e. Jeval to Jspark, Jspark to Jegr), adjusting cost values if necessary and recalculating Jeval, is begun and continues until such time as a global solution is achieved. The global solution is defined as the optimum fuel economy and emissions in terms of cost value (Jfinal) for each vehicle speed and wheel torque at each point of an operating parameter grid (transmission gear, spark advance, AFR, EGR, and combustion mode).

This process accounts for the time-varying after-treatment system by determining the amount of time the engine can spend in lean or stratified operation, and a LNT purge time by calculating a weighted average of the emissions from the lean or stratified mode and purge operation. By assuming a steady-state operation at each speed-load point, and by applying the same Lagrangian weighting factor for all vehicle operation modes, the optimization method, which is not cycle specific, provides calibrations with no defeat device like characteristics.

Other objects and advantages of the present invention will become apparent upon considering the following detailed description and appended claims, and upon reference to the accompanying drawings.

DESCRIPTION OF THE PREFERRED EMBODIMENT(S)

Figure 1:
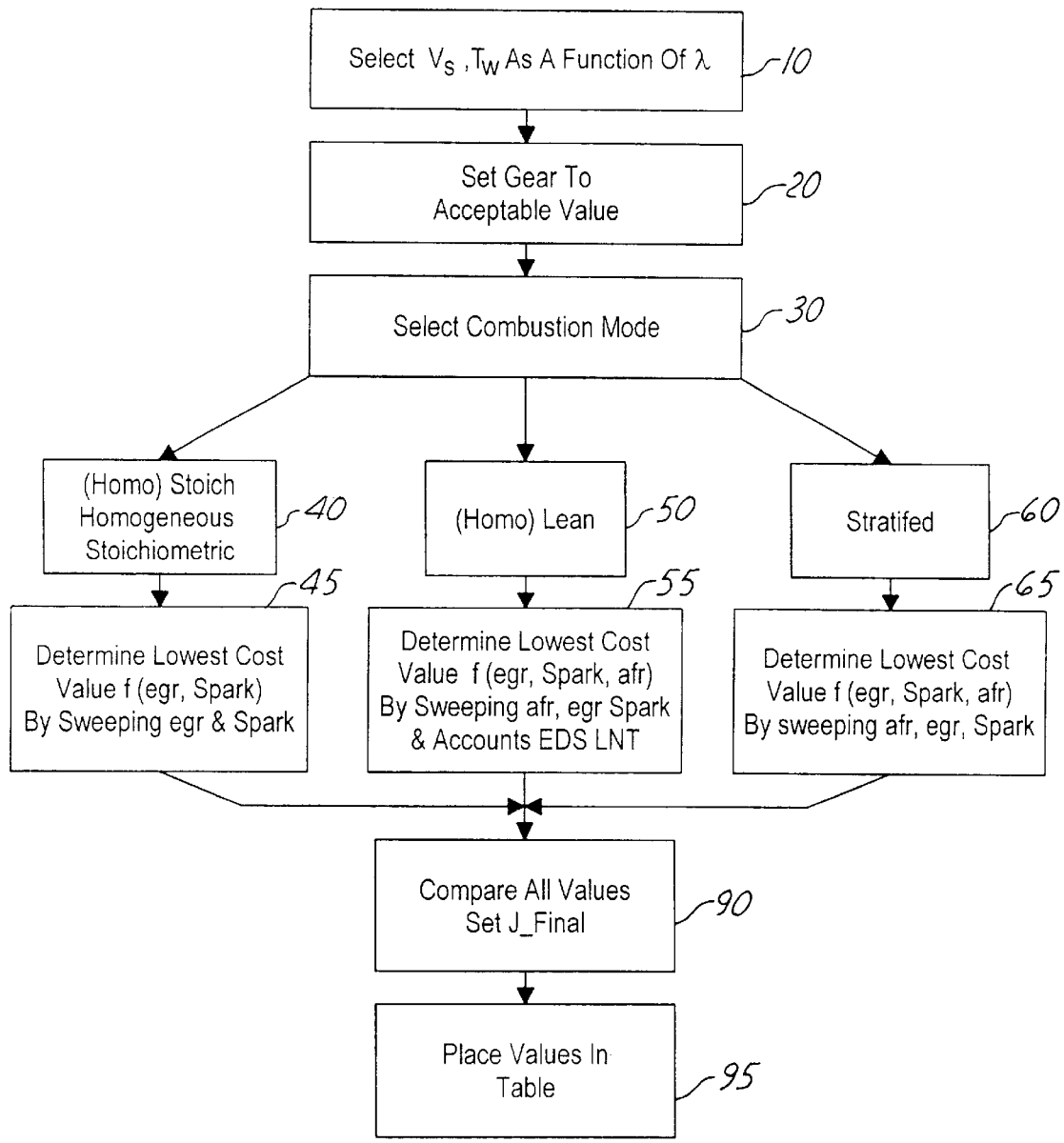
FIG. 1 is a logic flow diagram of one embodiment of the optimization process of the present invention.

FIG. 1 shows a flow chart for determining the optimum fuel economy and emissions characteristics where vehicle speed and wheel torque are known.

Referring to FIG. 1, in Step 10, an initial vehicle speed and an initial wheel torque are determined. In Step 20, an initial transmission gear is set that can accommodate the vehicle speed and wheel torque desired as known in the art. Then, in Step 30, a combustion mode for that particular transmission gear is selected. The combustion mode for a lean capable, multiple combustion mode engine may either be homogeneous stoichiometric (Step 40), homogeneous lean (Step 50) or stratified (Step 60).

Throughout the description, the term "cost" is used to refer to the fuel rate and level of emissions for particular engine parameters. The lowest "cost" value for each variable represents the ideal or preferred fueling rate and exhaust gas emission level for the particular engine parameters under consideration. A higher relative cost value would represent degraded performance from either a fuel or emissions point of view. Of course, however, the "lowest cost" value is a relative term which must be balanced between fuel and emissions as the lowest possible fueling rate may not correlate to the lowest emissions levels and vice versa. The actual target lowest cost value is, therefore, a design choice.

In Step 45, a lowest cost value for the homogeneous stoichiometric mode, hereinafter referred to as the lowest homogeneous stoichiometric mode cost value is determined by setting the AFR to stoichiometric and sweeping all of the possible spark advance values and EGR values.

In Step 55, a lowest cost value for the homogeneous lean mode, hereinafter referred to as the lowest homogeneous lean mode cost value is determined by sweeping all of the possible spark advance values, EGR values, and AFR values. In this process, the LNT purge mode that takes place in this engine-operating mode is also accounted for.

In Step 65, a lowest cost value for the stratified mode, hereinafter referred to as the lowest stratified mode cost value determined by sweeping all of the possible spark advance values, EGR values, and AFR values. In this process, the LNT purge mode that takes place in this engine-operating mode is also accounted for.

In Step 80, a determination is made if there is another transmission gear available to increment to that has not yet been selected, and if there is Step 85 determines whether this transmission gear is acceptable at the current wheel torque and vehicle speed. If the answer is no in either Step 80 or 85, the process continues to Step 90. If the answer is yes in Steps 80 and 85, proceed back to Step 20.

In Step 90, the lowest cost values determined in Steps 45, 55 and 65 are compared, and a final cost value (Jfinal) is determined by setting Jfinal equal to the lowest cost value of Steps 45, 55 and 65 taking into account all of the potential transmission gear values.

Finally, in Step 95, the values for AFR, EGR, spark advance, transmission gear, and combustion mode are stored in a table. The table is then expanded to include all of the potential vehicle speeds and wheel torques.

Figure 2A:
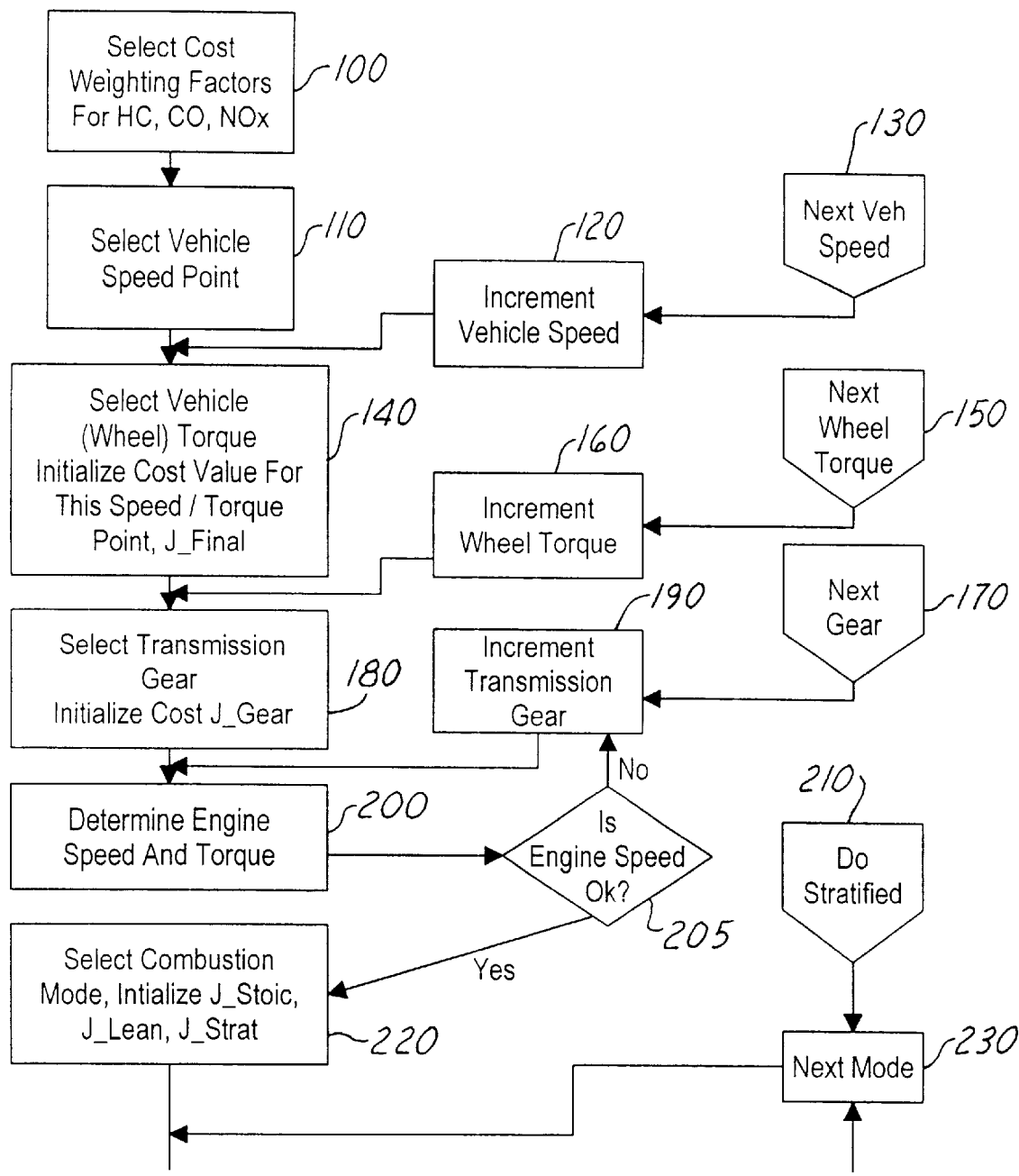
FIGS. 2a, 2b are a detailed logic flow diagram of a portion of FIG. 1.
Figure 2:
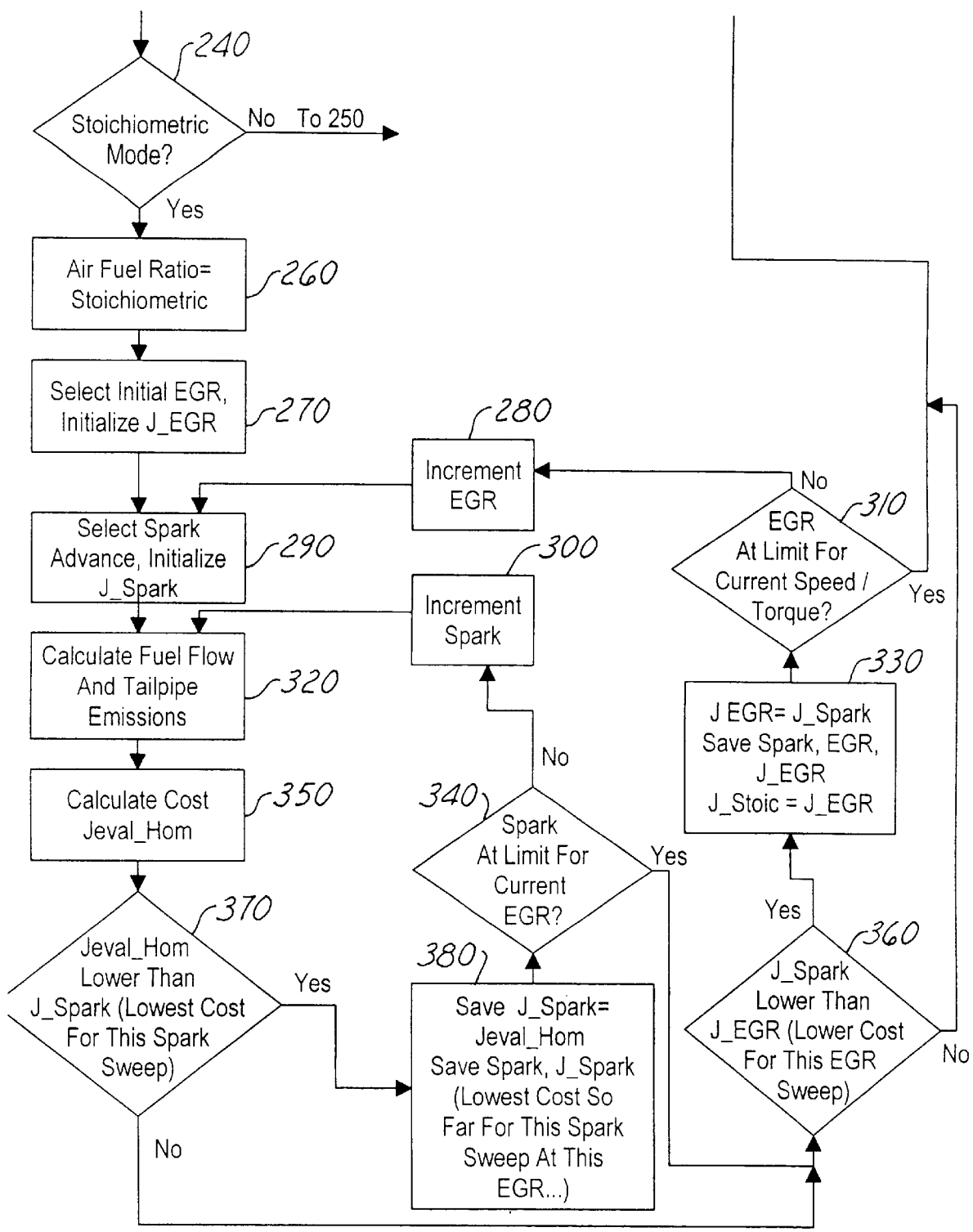

Referring to FIG. 2, in Step 100, cost weighting factors (Lagrangian multipliers) are chosen for HC, CO and $NO_x$ emissions that are expected to result in desired tailpipe emissions for a particular emission cycle. Next, a first vehicle speed and a first wheel torque value are selected in Steps 110 and 140, respectively, from a predetermined table of vehicle speed and wheel torque values that represent the expected range of vehicle operation. The optimum cost value (Jfinal) for this vehicle speed and wheel torque is initially set to a large value in Step 140.

In Step 180, a first transmission gear is selected and the cost value for this transmission gear (Jgear) is initially set to a large value. In step 200, the engine speed and required engine output torque are calculated by known methods based on this first transmission gear from the vehicle speed and wheel torque, plus any expected torque and drivetrain losses. Step 205 determines whether the engine speed calculated in Step 200 is outside of predetermined acceptable values as known in the art, and if it is, a new transmission gear is selected in Step 190 and the process reverts back to Step 200.

If the engine speed is within acceptable values, Step 220 is initiated, whereby a combustion mode and initial cost values for all possible combustion modes (Jstoich, Jlean, and Jstrat) are selected. Step 240 determines whether the combustion mode selected in Step 220 was stoichiometric. If the combustion mode was not stoichiometric, go to step 250, which is the lean/stratified subroutine of FIG. 3. Otherwise, Step 260 sets AFR at stoichiometry and Step 270 selects an initial value for EGR and for the cost value of EGR (Jegr). Step 290 then selects an initial spark advance and an initial cost value for spark advance (Jspark), and in Step 320 values for fuel flow and tailpipe emissions are determined from models and regressions that describe the behavior of an engine and catalyst system at the respective operating parameters (spark advance, EGR, engine speed, engine torque, and AFR). A cost value (Jeval_hom) for operating the system based upon these respective operating parameters is then determined.

In Step 370, it is determined whether the current cost value (Jeval_hom) is at a minimum for this particular spark advance. Step 370 compares the Jeval_hom determined in Step 350 with the Jspark set in Step 290. If Jeval_hom is larger than Jspark, the minimum value in the spark advance has been passed, the spark loop is terminated, and the process continues to Step 360. If Jeval_hom is less than Jspark, then Jspark is updated to this lower cost value(equal to Jeval) and the spark advance value that resulted in this cost value is stored in Step 380.

In Step 340, it is determined whether the current value of spark advance has reached the limit of acceptable spark advances for the current level of EGR at the current engine speed and engine torque. If the limit has been reached, the spark loop is terminated by moving to Step 360. Otherwise, the spark advance value is incremented in Step 300 and a new evaluation of this new value of spark advance is started in Step 320.

When Step 360 is reached, the Jspark is compared to Jegr, and if Jspark is greater than Jegr, the minimum point in the EGR sweep has been passed and the EGR sweep is terminated by going to Step 230. If Jspark is less than Jegr, then Jegr is updated to the lower cost value (equal to Jspark) and saved along with the current EGR and spark advance values in Step 330. Also, in Step 330, the cost value for the current combustion mode Jstoich is set equal to Jegr. Then, in Step 310, it is determined whether the maximum value for EGR for this particular engine speed and wheel torque has been reached. If it has, the EGR loop is terminated by going to Step 230, otherwise the value of EGR in Step 280 is incremented and another spark advance loop is initiated at this new level of EGR starting in Step 290.

At the termination of the homogeneous stoichiometric mode, the spark advance, EGR, Jspark, Jegr, and Jstoich have been determined that results in the lowest cost value for the homogeneous stoichiometric combustion mode. Step 230 then directs the process to select another mode (either stratified or homogeneous lean) and proceed to Step 250.

Figure 3A:
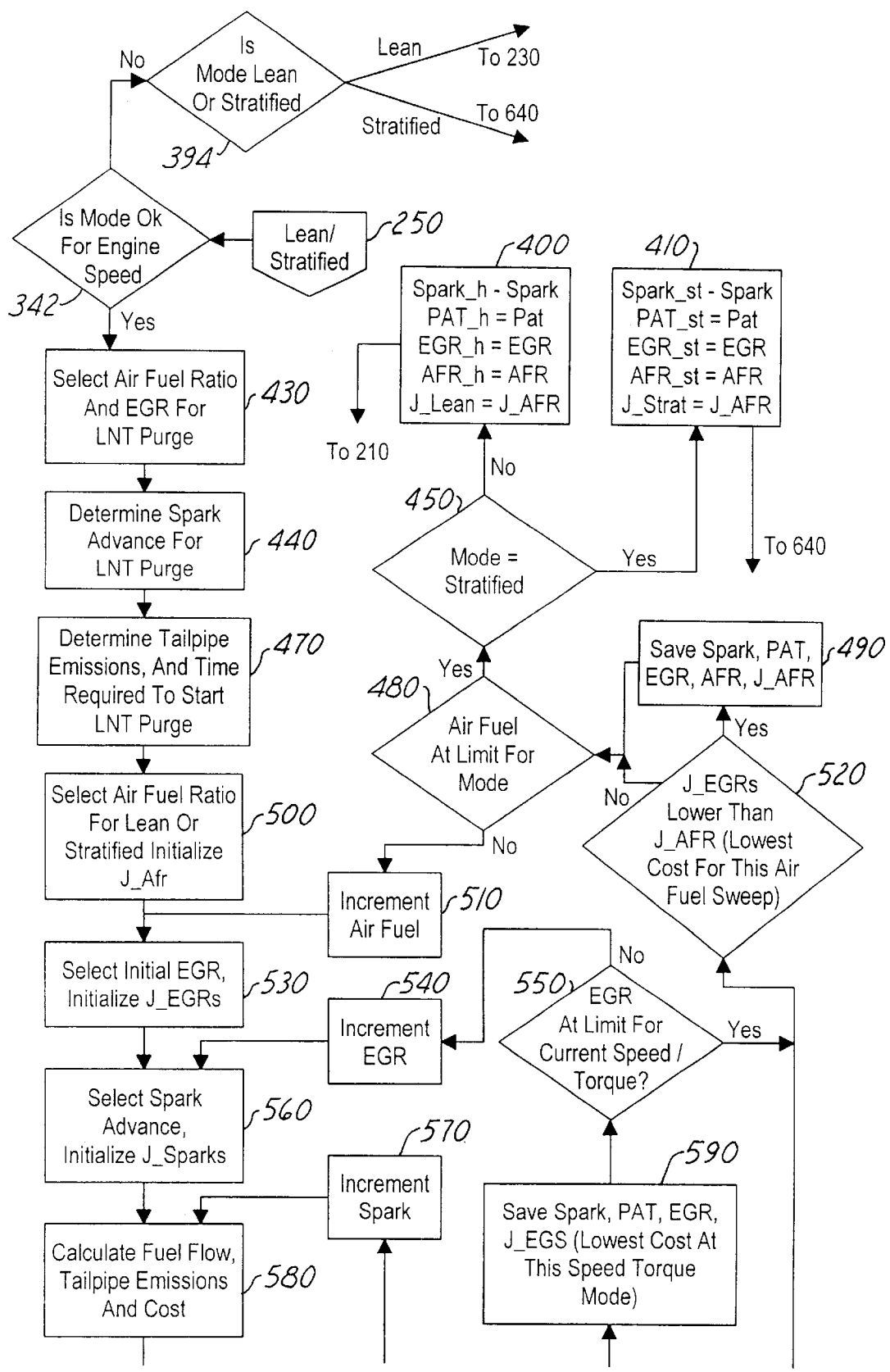
FIGS. 3a, 3b are a logic flow diagram for the lean stratified subroutine of FIGS. 2a, 2b.
Figure 3B:
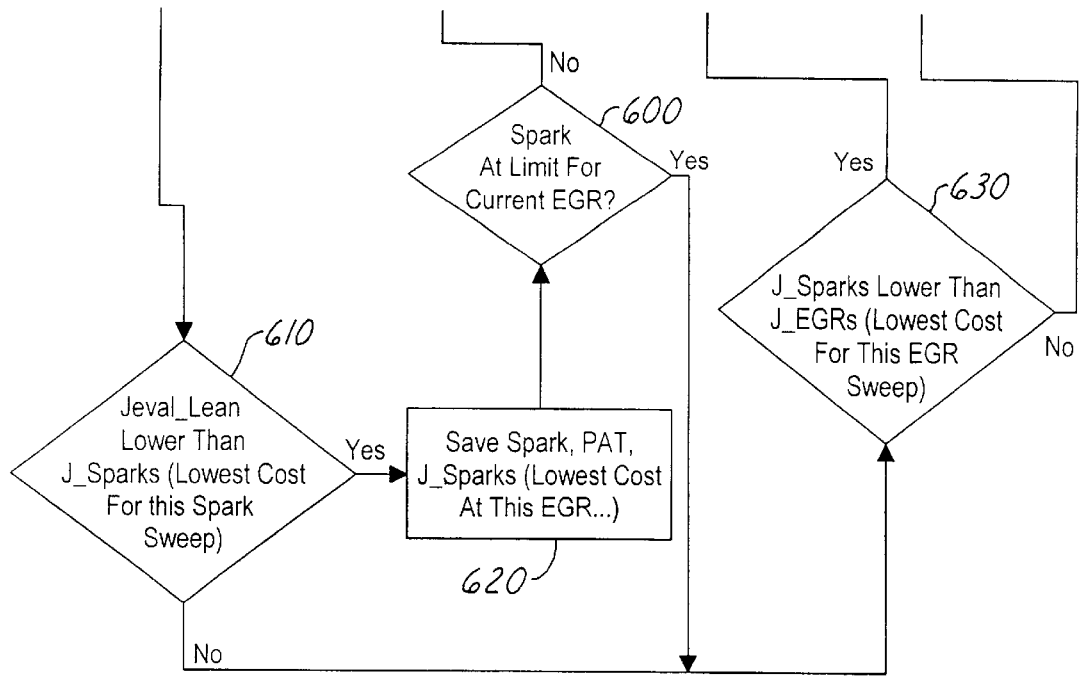

FIG. 3 shows the logic diagram for the lean stratified subroutine of FIG. 2. Referring to FIG. 3, Step 392 determines whether the current combustion mode is capable of operating at the current wheel torque and vehicle speed and transmission gear, if it is the logic proceeds to Step 430, else the logic proceeds to Step 394. Step 394 determines whether the combustion mode is homogeneous lean or stratified, if it is homogeneous lean go to Step 230 and select another mode (from homogeneous lean to stratified) and again proceed to Step 390. If Step 394 determines that it is in stratified mode proceed to the compare modes subroutine of FIG. 4, which is described below.

When evaluating the cost for the lean homogeneous and stratified combustion modes, the determination of the fuel consumption and emissions is complicated by the fact that the efficiency of the lean $NO_x$ trap (LNT) varies as a function of $NO_x$ levels, thus affecting fuel consumption and emissions. In addition, fuel consumption and emissions also varies as a function of the $NO_x$ purging cycle. Thus, a determination is made in Step 430 to define the desired AFR and EGR for the $NO_x$ purging cycle. Then, an optimum spark advance is determined in Step 440 in a similar manner as was described in Steps 290, 320, 350, 370, 380, 340, 300, 360, and 330 above. When a $NO_x$ purge cycle is initiated, it is first necessary to deplete the stored oxygen in any catalyst upstream of the LNT. Since the emissions output time required for this portion of the purge cycle depends only on the purge calibration, Step 470 determines the values for tailpipe emissions and the time required to start the LNT purge to use in Step 580 below.

In Step 500, a starting value for AFR is determined for the current combustion mode (homogeneous lean or stratified). Alternatively, manifold pressure or air change may be substituted for AFR in the stratified mode A Jafr (or correspondingly a Jmanifold) will be selected for the AFR (or manifold pressure) sweep. Similar to the steps described above, initial values for EGR, spark advance, Jegr, and Jspark are set in Steps 530 and 560.

Steps 610, 620, 600, 570, 630, 590, 550 and 540 are also similar to Steps 370, 380, 340, 300, 360, 330, 310 and 280 as described above. The principle difference is that a LNT purge activation threshold (PAT) is determined in Step 590 and is stored along with the spark advance and EGR values. Step 520 then determines if the Jafr (or Jmanifold) at the current AFR (or manifold) is lower than the Jegr. If Jafr is lower than Jegr, the values for spark advance, PAT, EGR, and Jafr are saved in Step 490 and the process proceeds to Step 480. If Jafr is not lower than Jegr, the logic proceeds directly to Step 480. In Step 480, if the AFR (or manifold pressure) limits are reached for this combustion mode, Step 450 determines whether the combustion mode is homogeneous lean or stratified, and the values for spark advance, PAT, EGR AFR and either Jlean (set equal to Jafr) or Jstrat (set equal to Jafr) are saved in either Step 400 or Step 410, respectively.

From Step 400, the process restarts for a stratified mode in Step 210, where the combustion mode is set to stratified in the next mode step (Step 230) and the process proceeds to Step 240 and loops again. From Step 410, the process moves to the compare modes step (Step 640) to be discussed below with reference to FIG. 4.

If the AFR (or manifold pressure) limits have not been reached, the AFR is then incremented in Step 510 and the process returns to Step 530 to continue looping through the AFR/manifold pressure loop.

Figure 4:
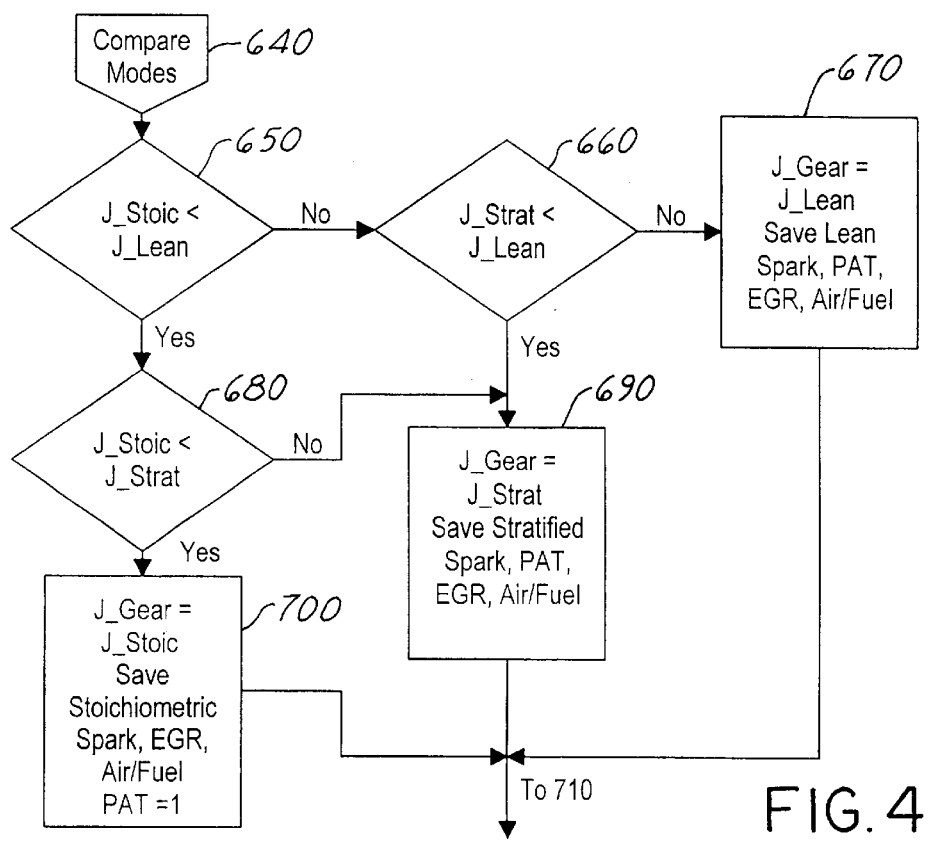
FIG. 4 is a logic flow diagram for the compare modes subroutine of FIGS. 3a, 3b.

FIG. 4 shows the logic diagram for the compare modes subroutine of FIG. 3. In FIG. 4, Step 640 compares the cost values of Jstoich, Jlean and Jstrat (Steps 650, 660, and 680). If Jstoic is determined to be the lowest cost value, then Step 700 sets Jgear equal to Jstoic and saves values for the spark advance, EGR, and AFR. PAT is set equal to 1.0 in Step 700 as well since a $NO_x$ purge step is not performed in the homogeneous stoichiometric combustion mode. If Jstrat is determined to be the lowest cost value, then Step 690 sets Jgear equal to Jstrat and saves the associated values for spark advance, PAT, EGR, and AFR. If Jlean is the lowest cost value, then Step 670 sets Jgear equal to Jlean and saves the associated values for spark advance, PAT, EGR and AFR. From Steps 700, 690 or 670, the process proceeds to Step 710, the check gears subroutine of FIG. 5.

Figure 5:
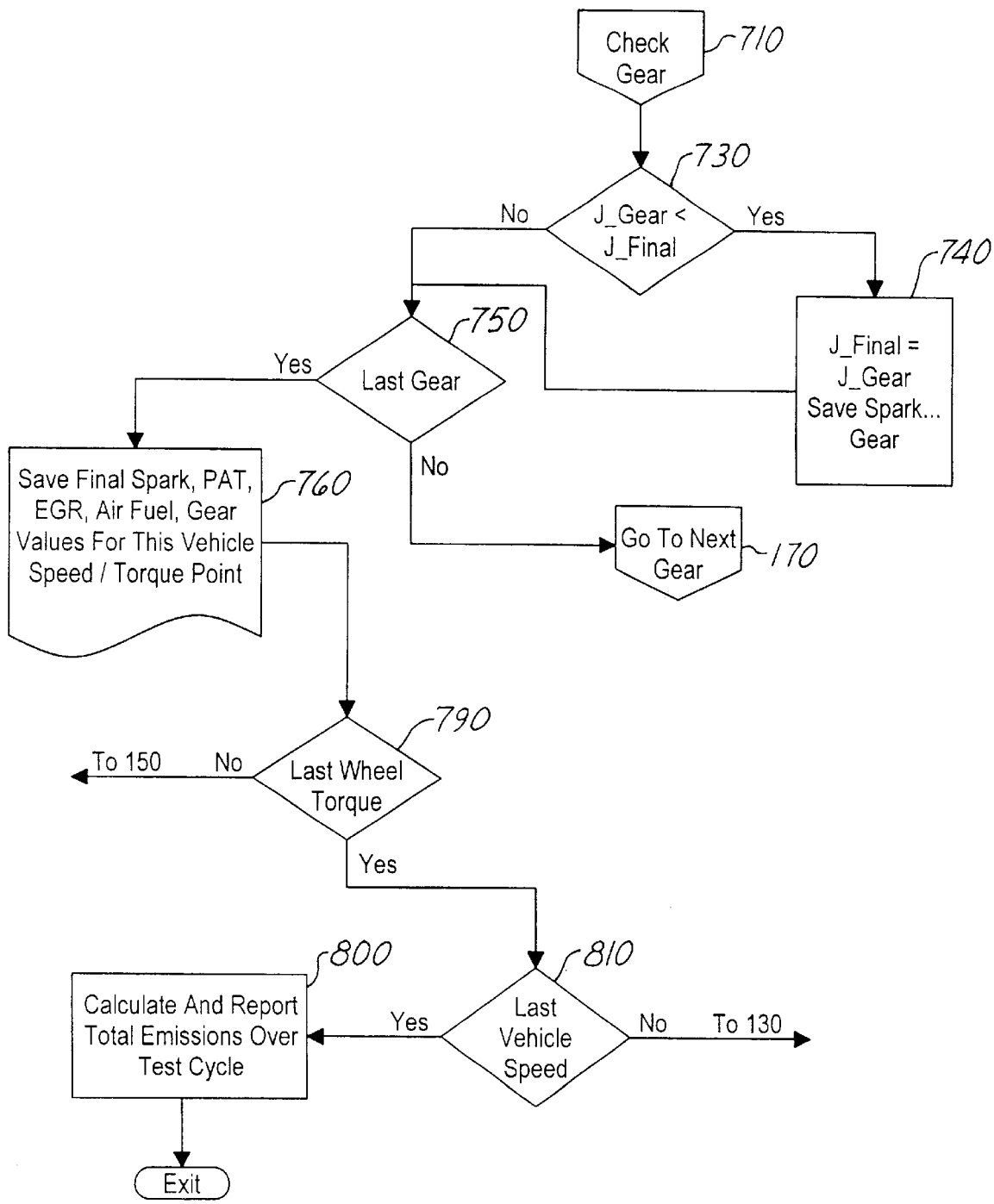
FIG. 5 is a logic flow diagram for the check gear subroutine of FIG. 4.

FIG. 5 shows the logic diagram of the check gears subroutine of FIG. 4. In FIG. 5, Step 730 proceeds via Step 710 and determines whether Jgear is less than Jfinal. If Jgear is less than Jfinal, set Jfinal equal to Jgear and store the values for spark advance and transmission gear in Step 740 and proceed to Step 750. If Jgear is not less than Jfinal, proceed to Step 750, where there is a determination whether to try another transmission gear. If the current transmission gear is the last transmission gear, Step 760 saves all of the optimum values for transmission gear, combustion mode, AFR, EGR, spark advance and PAT for this particular vehicle speed and engine torque.

Having completed the evaluation for one combination of vehicle speed and wheel torque values, the wheel torque is incremented and the process restarts at Step 790 and 150. After evaluating all of the possible wheel torques at one vehicle speed, the vehicle speed is then incremented and the process restarts at Steps 810 and 130.

Finally, after it is determined in Step 810 that all of the possible vehicle speeds have been swept, in step 800, the optimal fuel economy and emissions cost values for each speed/load point, along with the time spent at each of the points along a particular emissions cycle, are used to determine an estimate of tailpipe emissions and fuel economy for the cycle.

If necessary, the results of Step 800 can be compared with known emissions standards and the Lagrangian cost values set in Step 100 can be modified and the program re-run to modify the optimal settings achieved.

Figure 6:
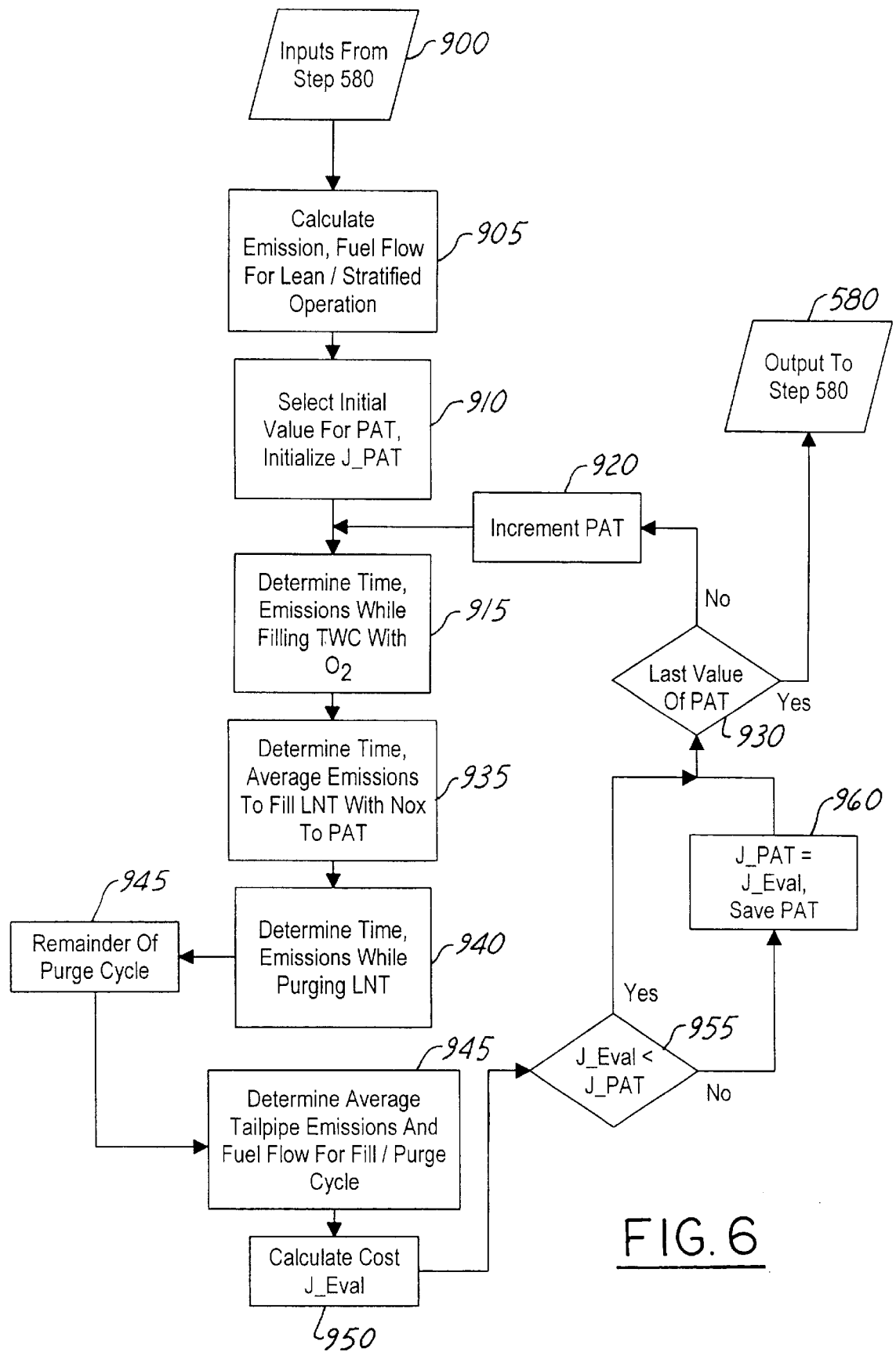
FIG. 6 is a logic flow diagram of a portion of FIGS. 3a, 3b.

FIG. 6 shows the logic diagram of a portion of the logic of FIG. 3. Referring now to FIG. 6, the values from Step 580 of FIG. 3 are used to calculate the engine out emissions and fuel flow in Step 905 during lean or stratified operation. In Step 910, initial values are set for PAT and Jpat, which represents the cost value for the purge activation threshold. Based on the information in Step 910 and catalyst behavior known in the art, the average tailpipe emissions and time spent filling the catalysts with oxygen during the lean or stratified operation is determined in Step 915. In Step 935, the average tailpipe emissions and time spent while the $NO_x$ trap is filled with $NO_x$ to the PAT is determined. In Step 940, the average tailpipe emissions and time during the LNT purge is determined. Finally, in Step 945, the average tailpipe emissions and time spent during the fill/purge cycle is determined. Step 950 averages the tailpipe emissions and fuel flow over the entire fill/purge cycle. The cost function, Jeval, is then determined in Step 952 and compared to Jpat in Step 955 and, if Jeval is lower than Jpat, then Jpat is set to Jeval and the current PAT is save for future reference in Step 960. The process continues to Step 930 where it is determined whether the limit of PAT is reached, and if so the loop is terminated and the output given to Step 580 described above. If the limit of PAT is not reached, PAT is incremented in Step 920 and the process returns to Step 915. The values determined in Step 960 after the last value of PAT is determined in Step 930 are then outputted for use in Step 580 listed above.

From the foregoing it will be seen that there has been brought to the art a new method of generating a shift schedule and combustion mode schedule for each vehicle speed, wheel torque and transmission gear associated with a lean capable, multiple combustion mode engine, such as a direct injection engine, such that a cost value for fuel consumption and emissions characteristics is optimized by generating a lowest transmission gear cost value as a function of an engine operating mode and storing this value in a shift and combustion mode schedule. Thus, for every point on a vehicle speed and wheel torque grid for a lean capable, multiple combustion mode engine, the grid will predetermine the appropriate transmission gear, combustion mode, AFR, EGR, and spark advance to optimize emissions and fuel economy while accounting for a time variant aftertreatment system.

While the invention has been described in terms of preferred embodiments, it will be understood, of course, that the invention is not limited thereto since modifications may be made by those skilled in the art, particularly in light of the foregoing teachings.

What is claimed is:

1. A method of generating a shift schedule and combustion mode schedule for each vehicle speed and wheel torque value associated with a lean capable, multiple combustion mode engine, such that a cost value for fuel consumption and emissions characteristics is optimized, said method comprising the steps of:
   (a) generating a lowest cost value as a function of an engine operating mode, wherein said engine operating mode is selected from a group consisting of a homogeneous stoichiometric mode, a homogeneous lean mode, and a stratified mode; and
   (b) storing said lowest cost value in said shift schedule and combustion mode schedule.

2. The method of generating a shift schedule and combustion mode schedule according to claim 1, wherein the step of generating a lowest cost value comprises the step of:
   (a) generating a lowest homogeneous stoichiometric mode cost value, a lowest homogeneous lean mode cost value, and a lowest stratified mode cost value as a function of an engine operating parameter; and
   (b) setting said lowest cost value equal to the lowest of said lowest homogeneous stoichiometric cost value, said lowest homogeneous mode cost value, and said lowest stratified mode cost value.

3. A method according to claim 2, where the method of setting said lowest cost value comprises the step of setting said lowest cost value, where said lowest cost values represent a plurality of engine operating parameter values.

4. A method according to claim 3, wherein the step of representing a plurality of engine operating parameter values comprises the step of representing a plurality of engine operating parameter values, where said plurality of engine operating parameters consists of an EGR value, a spark advance value, a transmission gear value, and an AFR value.

5. A method of generating a shift schedule and combustion mode schedule for each vehicle speed, wheel torque and transmission gear value associated with a lean capable, multiple combustion mode engine, such that a cost value for fuel consumption and emissions characteristics is optimized, said method comprising the steps of:
   (a) generating a lowest transmission gear cost value as a function of an engine operating mode, wherein said engine operating mode is selected from a group consisting of a homogeneous stoichiometric mode, a homogeneous lean mode, and a stratified mode; and
   (b) storing said lowest transmission gear cost value in said shift schedule and combustion mode schedule.

6. The method of generating a shift schedule and combustion mode schedule according to claim 5, wherein the step of generating a lowest transmission gear cost value comprises the step of:
   (a) generating a lowest homogeneous stoichiometric mode cost value, a lowest homogeneous lean mode cost value, and a lowest stratified mode cost value as a function of an engine operating parameter; and
   (b) setting said lowest transmission gear cost value equal to the lowest of said lowest homogeneous stoichiometric cost value, said lowest homogeneous mode cost value, and said lowest stratified mode cost value.

7. The method of claim 6, wherein the step of generating said lowest homogeneous stoichiometric mode cost value comprises the step of generating said lowest homogeneous stoichiometric mode cost value as a function of an exhaust gas recirculation value and a spark advance value.

8. The method of claim 7, wherein the step of generating a lowest homogeneous stoichiometric mode cost value as a function of an exhaust gas recirculation value and a spark advance value comprises for each exhaust gas recirculation value and spark advance value:
   (a) setting an initial exhaust gas recirculation cost value and an initial spark advance cost value;
   (b) determining an evaluation cost value as a function of said exhaust gas recirculation value and said spark advance value;
   (c) comparing said evaluation cost value with said spark advance cost value;
   (d) setting said spark advance value equal to said evaluation cost value where said evaluation cost value is lower than said spark advance value; incrementing said spark advance value as a function of said exhaust gas recirculation value; and repeating steps (b) through (d); otherwise;
   (e) comparing said spark advance cost value with said exhaust gas recirculation cost value;
   (f) setting said exhaust gas recirculation cost value equal to said spark advance cost value where said where said spark advance cost value is lower than said exhaust gas recirculation cost value; incrementing said exhaust gas recirculation value as a function of said homogeneous stoichiometric mode; and repeating steps (a) through (f); otherwise;
   (g) setting said lowest homogeneous stoichiometric mode cost value equal to said exhaust gas recirculation cost value.

9. The method of claim 6, wherein the step of generating said lowest homogeneous lean mode cost value comprises the step of generating said lowest homogeneous lean mode cost value as a function of an air fuel ratio value, an exhaust gas recirculation value and a spark advance value.

10. The method of claim 9, wherein the step of generating a lowest homogeneous lean mode cost value as a function of an air fuel ratio value, an exhaust gas recirculation value and a spark advance value comprises for each air fuel ratio value, exhaust gas recirculation value and spark advance value:

(a) setting an initial air fuel ratio value, an initial exhaust gas recirculation cost value and an initial spark advance cost value;

(b) determining an evaluation cost value as a function of said air fuel ratio value, said exhaust gas recirculation value and said spark advance value;

(c) comparing said evaluation cost value with said spark advance cost value;

(d) setting said spark advance value equal to said evaluation cost value where said evaluation cost value is lower than said spark advance value; incrementing said spark advance value as a function of said exhaust gas recirculation value; and repeating steps (b) through (d); otherwise;

(e) comparing said spark advance cost value with said exhaust gas recirculation cost value;

(f) setting said exhaust gas recirculation cost value equal to said spark advance cost value where said where said spark advance cost value is lower than said exhaust gas recirculation cost value; incrementing said exhaust gas recirculation value as a function of said homogeneous lean mode; and repeating steps (a) through (f); otherwise;

(g) comparing said exhaust gas recirculating cost value with said air fuel ratio cost value;

(h) setting said air fuel ratio cost value equal to said exhaust gas recirculating cost value where said air fuel ratio cost value is lower than said exhaust gas recirculating cost value; incrementing said air fuel ratio value as a function of said homogeneous lean mode; and repeating steps (a) through (h); otherwise;

(i) setting said lowest homogeneous lean mode cost value equal to said air fuel ratio cost value.

11. The method of claim 6, wherein the step of generating said lowest homogeneous lean mode cost value comprises the step of generating said lowest homogeneous lean mode cost value as a function of a manifold pressure, an exhaust gas recirculation value and a spark advance value.

12. The method of claim 11, wherein the step of generating a lowest homogeneous lean mode cost value as a function of a manifold pressure value, an exhaust gas recirculation value and a spark advance value comprises for each manifold pressure value, exhaust gas recirculation value and spark advance value:

(a) setting an initial manifold pressure value, an initial exhaust gas recirculation cost value and an initial spark advance cost value;

(b) determining an evaluation cost value as a function of said manifold pressure value, said exhaust gas recirculation value and said spark advance value;

(c) comparing said evaluation cost value with said spark advance cost value;

(d) setting said spark advance value equal to said evaluation cost value where said evaluation cost value is lower than said spark advance value; incrementing said spark advance value as a function of said exhaust gas recirculation value; and repeating steps (b) through (d); otherwise;

(e) comparing said spark advance cost value with said exhaust gas recirculation cost value;

(f) setting said exhaust gas recirculation cost value equal to said spark advance cost value where said where said spark advance cost value is lower than said exhaust gas recirculation cost value; incrementing said exhaust gas recirculation value as a function of said homogeneous lean mode; and repeating steps (a) through (f); otherwise;

(g) comparing said exhaust gas recirculating cost value with said manifold pressure cost value;

(h) setting said manifold pressure cost value equal to said exhaust gas recirculating cost value where said manifold pressure cost value is lower than said exhaust gas recirculating cost value; incrementing said manifold pressure value as a function of said homogeneous lean mode; and repeating steps (a) through (h); otherwise;

(i) setting said lowest homogeneous lean mode cost value equal to said air fuel ratio cost value.

13. The method of claim 6, wherein the step of generating said lowest stratified mode cost value comprises the step of generating said lowest stratified mode cost value as a function of an air fuel ratio value, an exhaust gas recirculation value and a spark advance value.

14. The method of claim 13, wherein the step of generating a lowest stratified mode cost value as a function of an air fuel ratio value, an exhaust gas recirculation value and a spark advance value comprises for each air fuel ratio value, exhaust gas recirculation value and spark advance value:

(a) setting an initial air fuel ratio value, an initial exhaust gas recirculation cost value and an initial spark advance cost value;

(b) determining an evaluation cost value as a function of said air fuel ratio value, said exhaust gas recirculation value and said spark advance value;

(c) comparing said evaluation cost value with said spark advance cost value;

(d) setting said spark advance value equal to said evaluation cost value where said evaluation cost value is lower than said spark advance value; incrementing said spark advance value as a function of said exhaust gas recirculation value; and repeating steps (b) through (d); otherwise;

(e) comparing said spark advance cost value with said exhaust gas recirculation cost value;

(f) setting said exhaust gas recirculation cost value equal to said spark advance cost value where said where said spark advance cost value is lower than said exhaust gas recirculation cost value; incrementing said exhaust gas recirculation value as a function of said stratified mode; and repeating steps (a) through (f);

(g) comparing said exhaust gas recirculating cost value with said air fuel ratio cost value;

(h) setting said air fuel ratio cost value equal to said exhaust gas recirculating cost value where said air fuel ratio cost value is lower than said exhaust gas recirculating cost value; incrementing said air fuel ratio value as a function of said stratified mode; and repeating steps (a) through (h); otherwise;

(i) setting said lowest stratified mode cost value equal to said air fuel ratio cost value.

* * * * *